No. 871,171. PATENTED NOV. 19, 1907.
O. O. KRUH.
VAPOR RECTIFIER SYSTEM.
APPLICATION FILED MAR. 13, 1907.
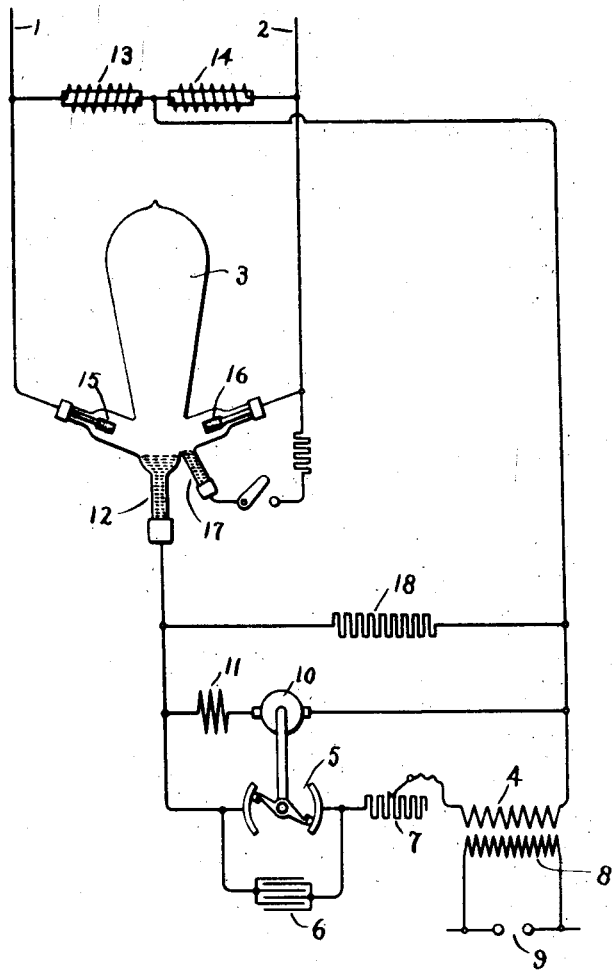
Witnesses
J. Ellis Glen.
Marcus L. Byng.
Inventor
Osias O. Kruh.
by Albert G. Davis
Atty.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

VAPOR-RECTIFIER SYSTEM.

No. 871,171.  Specification of Letters Patent.  Patented Nov. 19, 1907.

Application filed March 13, 1907. Serial No. 362,173.

*To all whom it may concern:*

Be it known that I, OSIAS O. KRUH, a subject of the Emperor of Austria-Hungary, residing at Schenectady, county of Schenectady, State of New York, have invented certain new and useful Improvements in Vapor-Rectifier Systems, of which the following is a specification.

This invention relates to electrical systems in which a vapor electric device is utilized for converting alternating current into direct current.

It comprises a system whereby vapor electric devices may be utilized for supplying current to a load circuit which is subject to a back flow of energy; a load circuit such as is formed by an induction coil and its interrupter.

Mercury vapor rectifiers, as normally operated, transmit current from one or more anodes to a mercury cathode. At least one of the anodes must remain positive with respect to the cathode in order that the arc may not go out. If such a rectifier is used on a load circuit capable of developing a back kick or back flow of current, the rectifier is liable to extinguishment when this back kick approaches a voltage sufficient to overpower the normal alternating current supply voltage for that particular instant. According to the present invention the rectifier is so protected by auxiliary means that back kicks from the load circuit are diverted from the rectifier and thereby become ineffective and harmless.

The fundamental idea of my invention will be better understood after consideration of a specific embodiment, such as is hereinafter described and illustrated in the accompanying drawing.

The system illustrated in the drawing comprises a source of energy indicated by line conductors 1 and 2, a vapor rectifier 3 of ordinary type, and a load circuit comprising the primary 4 of an induction coil together with its interrupter 5 and the usual spark absorbing condenser 6 and adjustable series resistance 7. The primary 8 of the induction coil may be connected to sparking terminals 9 of ordinary type. The interrupter is illustrated as of the mechanical make and break type driven by a small series motor comprising the armature 10 and the field winding 11. This motor may be connected directly on shunt to the load circuit of the rectifier. Other forms of interrupters are suitable for use in the above relation, and the make and break interrupter is used for illustrative purposes. The load circuit may be connected between the mercury cathode 12 of the vapor rectifier and the neutral point of two reactances 13 and 14 connected in series across the source of power. The vapor rectifier is provided with the usual main anodes 15 and 16 and with a starting anode 17.

When the rectifier is started on light load, that is with the spark gap 9 of the induction coil short circuited or shortened in length, the rectifier will operate without difficulty and will deliver uni-directional current to the interrupter 5 and the primary 4 of the induction coil. The interrupter serves to cut this uni-directional current into a succession of uni-directional pulsations of suitable frequency, and these induce an alternating electromotive force in the secondary 8 of the induction coil. It will be noted that the series motor takes current continually, thus affording a continuous demand for current from the rectifier tube whether the interrupter 5 is in the open or closed position. If, now, the load on the induction coil is increased, as by gradually cutting out resistance 7, the system becomes more and more unstable and finally the rectifier goes out. This inoperative condition may be reached at current values as low as half the normal current for the primary of the induction coil.

More than one cause may contribute to the extinction of the rectifier arc, but probably the trouble arises from oscillations produced in the load circuit. This load contains a spark gap, capacity and a reactance and circuits of this nature, as is well known, are liable to high frequency oscillations and disturbances. These disturbances, of course, increase with the quantity of current through the load,—consequently the vapor rectifier becomes more and more unstable as the load current thereon approaches the normal full load value. This is a phenomenon quite different from the instability produced by a gradually decreasing load current.

Whatever the cause may be which causes the rectifier to go out when the load on the induction coil is increased, I find that the trouble may be obviated by connecting a non-inductive resistance 18 between the rectifier cathode and the conductor leading back to reactances 13 and 14. The resistance is in shunt with the series motor and also in shunt with the load circuit consisting of interrupter and induction coil. Presumably the oscillations or back flows from the load circuit are dissipated through the non-inductive resistance 18 and therefore are not transmitted to the vapor rectifier, or at least not in sufficient quantity to put the rectifier out. I do not, however, desire to be limited to any particular theory and consider that my invention includes all those modifications of apparatus which come within the scope of the appended claims.

What I claim as new and desire to secure by Letters Patent of the United States, is,—

1. The combination of a load circuit subject to back flow of energy, a vapor rectifier supplying current thereto, and an auxiliary path for current operatively connected to protect said rectifier from the current back flow of said load circuit.

2. The combination of a load circuit subject to back flow of current, a vapor rectifier supplying energy thereto, and a non-inductive resistance connected in shunt with said load circuit for protecting said rectifier from the back flowing current of said load.

3. The combination of an induction coil, an interrupter in circuit with one winding of said coil, a mercury rectifier supplying energy through said interrupter to said coil, and a substantially non-inductive path in shunt with said interrupter and coil.

4. The combination of an induction coil having sparking terminals, a vapor rectifier supplying current to the primary winding of said coil, and a path of low inductance forming a shunt path for oscillations occurring in said primary.

5. The combination of a load circuit including a primary of an induction coil, a vapor rectifier connected to said circuit, and a non-inductive resistance in shunt with said load circuit.

6. The combination with a load circuit, including an interrupter and a winding of an induction coil, a mercury rectifier supplying current to said load circuit, a reactive path for current connected in shunt with said load circuit, and a non-inductive path for current connected in shunt therewith.

7. The combination of an induction coil, a mechanical interrupter connected in series with one winding of said coil, a motor driving said interrupter and connected in shunt with said interrupter and winding, a non-inductive resistance connected in shunt with said motor, and a vapor electric device in circuit with said interrupter.

8. The combination of a load circuit subject to back flow of current, a vapor rectifier supplying energy thereto, an inductive current path in shunt with said load, and a non-inductive path for current also in shunt with said load.

In witness whereof, I have hereunto set my hand this 8th day of March, 1907.

OSIAS O. KRUH.

Witnesses:
BENJAMIN B. HULL,
HELEN ORFORD.